United States Patent [19]

Walter

[11] 4,432,739
[45] Feb. 21, 1984

[54] SPRING STEEL LIQUID-DAMPED SHAFT COUPLING

[75] Inventor: Jürgen Walter, Haltern-Hullern, Fed. Rep. of Germany

[73] Assignee: Hackforth GmbH & Co. KG, Herne, Fed. Rep. of Germany

[21] Appl. No.: 214,633

[22] Filed: Dec. 10, 1980

[30] Foreign Application Priority Data

Dec. 13, 1979 [DE] Fed. Rep. of Germany ....... 2950255

[51] Int. Cl.³ .................. F16D 3/00; F16D 3/14; F16D 3/80
[52] U.S. Cl. ..................... 464/24; 464/82; 464/86
[58] Field of Search ................ 64/27 B, 27 R, 27 L, 64/11 R, 15 R, 15 B; 464/24, 71, 82, 98, 180, 86

[56] References Cited

U.S. PATENT DOCUMENTS

| 2,379,175 | 6/1945 | Mulheim | 64/27 L |
| 3,791,169 | 2/1974 | Wright | 64/27 B |
| 3,996,767 | 12/1976 | Geislinger | 64/27 L |
| 4,104,891 | 8/1978 | Geislinger | 64/27 L |

FOREIGN PATENT DOCUMENTS

| 301065 | 10/1917 | Fed. Rep. of Germany | 64/27 B |
| 321621 | 6/1920 | Fed. Rep. of Germany | 64/27 B |
| 2810885 | 9/1979 | Fed. Rep. of Germany | 64/27 L |
| 931497 | 7/1963 | United Kingdom | 64/27 R |
| 1441504 | 7/1976 | United Kingdom | 64/27 B |

Primary Examiner—Stanley N. Gilreath
Attorney, Agent, or Firm—Becker & Becker, Inc.

[57] ABSTRACT

A spring steel, liquid-damped shaft coupling in which the torque is transmitted between an inner part and an outer part coaxial therewith by means of radial spring elements disposed in discrete liquid-filled chambers, the liquid in any chamber being displaced, in response to a relative movement, by the spring elements into the adjacent chamber; outwardly axially parallel torsion spring elements are provided on the radial spring elements and connect the same to the outer coupling part. To increase the torsional resilience, therefore, a torsion tube is connected to each radial spring element and projects axially on one side relative to the radial spring element; and a torsion bar extends in the torsion tube, is frictionally secured to the projecting end thereof, and at its other end engages in the outer coupling part at a distance from the radial spring element in such a way as to rotate solidly with the outer coupling part.

7 Claims, 5 Drawing Figures

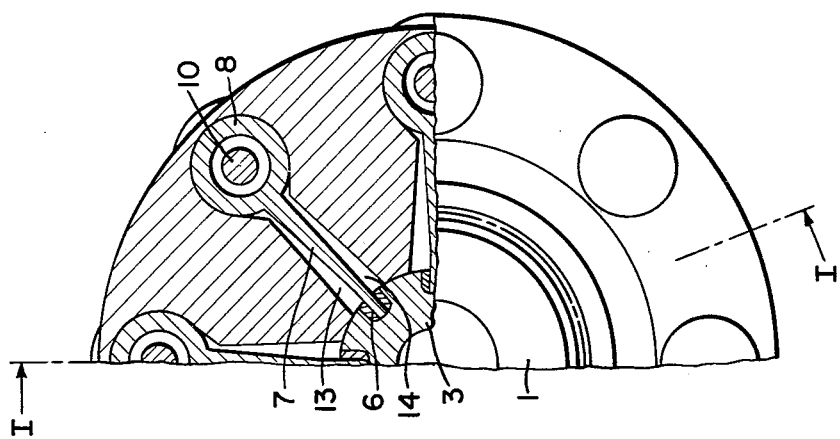
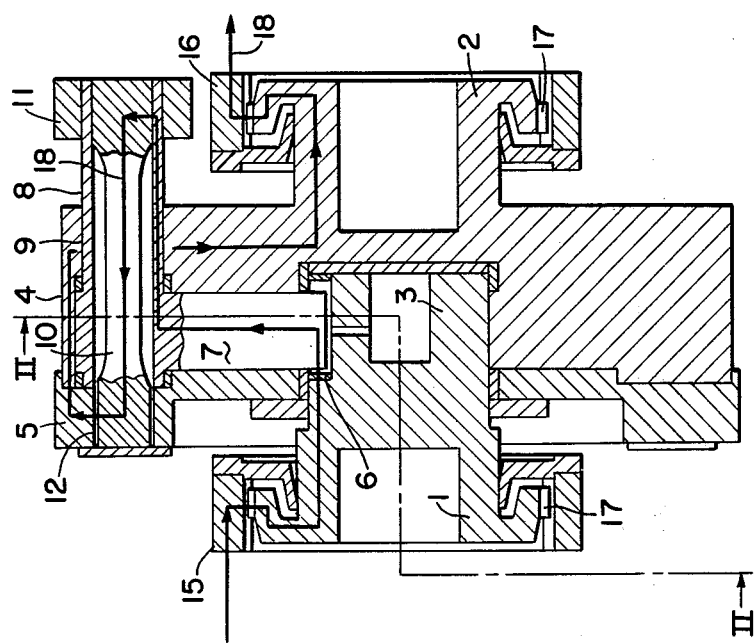

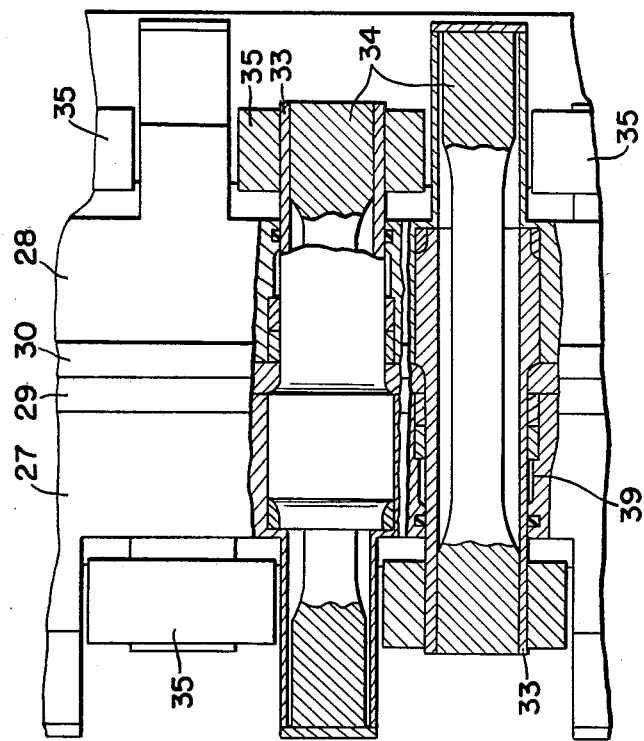

SPRING STEEL LIQUID-DAMPED SHAFT COUPLING

The present invention relates to a spring steel, liquid-damped shaft coupling in which the torque is transmitted between an inner part and an outer part coaxial therewith by means of radial spring elements disposed in discrete liquid-filled chambers, the liquid in any chamber being displaced, in response to a relative movement, by the spring elements into the adjacent chamber; outwardly axially parallel torsion spring elements, such as a journal and a sleeve, are provided on the radial spring elements and connect the same to the outer coupling part.

German Offenlegungsschrift No. 2 810 885 discloses one such shaft coupling wherein the radial spring elements have at their outer ends axially parallel bearing journals or mounting pins, one of which is stressed torsionally and thus helps to increase the torsional resilience of the coupling. Instead of the journal being clamped directly in the casing of the outer coupling part, a torsion tube which extends around the journal can be secured to the casing, with the tube and the journal being so interconnected as to rotate solidly. The general requirement that the axial length of a shaft coupling should be very reduced, means that the effective length of the journals is relatively short. If the torsionally stressed parts have a short effective length, the increase in torsional resilience can also be only slight.

The higher specific performances of modern diesel engines are largely due to a corresponding increase in specific combustion pressures. It has been found that the likelihood of disturbances increases with specific performance, a phenomenon which becomes particularly noticeable when low-quality fuel is used and causes disturbances such as cylinder failures. A diesel engine running with a disturbance is often acceptable, but the result is that resonant patches occur in the operative range of engine speeds and cause very high alternating torques and, therefore, severe fatigue of the shaft coupling between the engine and the device driven thereby.

If the fatique strength of a resilient shaft coupling is increased, the result is bound to be greater rigidity, something which is undesirable for several reasons, mainly because of the risk of damage occurring not to the relatively cheap shaft coupling, but to far more expensive components, such as the transmission.

Of course, the high fatigue strength requirement becomes less important if it is possible to provide a considerable increase in coupling resilience in association with fatique strength adequate for normal purposes.

It is an object of the present invention to make it possible in a spring steel, liquid-damped shaft coupling to increase the torsional resilience of the coupling considerably, without impairing fatique strength and without having to increase the external radial and axial dimensions above those of a conventional shaft coupling.

This object, and other objects and advantages of the present invention, will appear more clearly from the following specification in connection with the accompanying drawings, in which:

FIG. 1 is an axial section through a shaft coupling in the planes of the line I—I of FIG. 2;

FIG. 2 is an end view of the shaft coupling with a cross-section in the planes of the line II—II of FIG. 1;

FIG. 5 is a view looking onto the periphery of the shaft coupling of FIGS. 3 and 4 with axial sections near two adjacent torsion spring elements, the view being on an enlarged scale.

Figure 4:
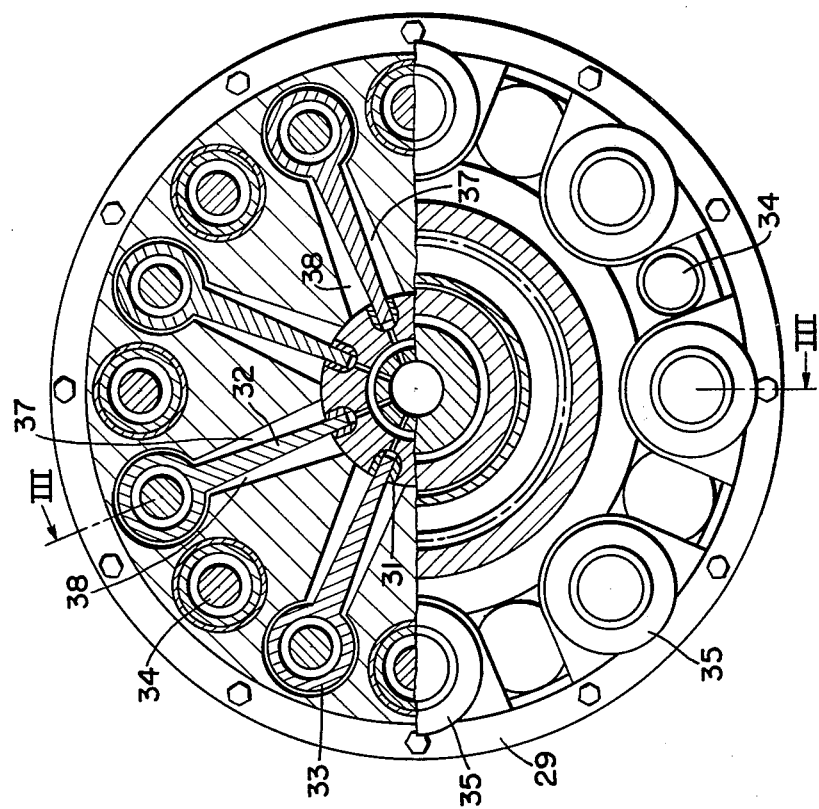
FIG. 4 shows cross-sections of the shaft coupling of FIG. 3 taken in the planes of the line IV—IV thereof.

The shaft coupling of the present invention is characterized primarily in that a torsion tube is connected to each radial spring element and projects axially on one side relative to the radial spring element; and a torsion bar extends in the torsion tube, is frictionally secured to the projecting end thereof, and at its other end engages in the outer coupling part at a distance from the radial spring element in such a way as to rotate positively or solidly with the outer coupling part.

Advantageously, the torsion tube is an integral part of the radial spring element. Conveniently, the length of the torsion tube part projecting beyond the radial spring element is more than half the total length of the torsion tube.

According to another feature of the invention, to provide an operative connection between the torsion tube and the torsion bar, a shrunk ring is disposed on the torsion tube in the region where the torsion bar is clamped.

The torsion spring elements of the shaft coupling in accordance with the invention are designed in such a way that the axial length available in the coupling can be used optimally as the effective length of a torsion spring system comprising a torsion tube extending over some of the available axial length, followed by a torsion bar, the length of which corresponds substantially to the total available axial length of the coupling. The invention therefore makes it possible to retain the conventional compact construction of a resilient shaft coupling of this kind while adding to each radial spring element a torsion spring system having a total effective spring length substantially twice that of the axial length of the coupling as determined by its external dimensions.

Another advantage of the coupling provided by the invention is that two identical couplings can be combined as halves of a coupling in a surprisingly small space, thus providing a further substantial increase in torsional resilience as compared with a single coupling having the same external radial dimensions. In accordance with the invention, in a shaft coupling in two halves in which the inner coupling parts are disposed in axially consecutive relationship, and the outer coupling parts are so interconnected as to rotate solidly with one another, the inner coupling parts are immediately adjacent one another and the projecting ends of the torque tubes of each coupling half engage free from torque, and, along the periphery, alternately to opposite sides, engage in recesses in the outer coupling part of the other coupling half.

Advantageously, in a shaft coupling of the kind just described, the inner coupling parts are mounted on a centering sleeve in such a way as to be freely rotatable but immobile axially. According to another feature of the invention, considerable space can be saved if the liquid-filled chambers of the two coupling halves are closed by a common annular or ring disc mounted on the centering sleeve.

A shaft coupling which comprises two halves in the manner just described has the great advantage of providing, with only a minor increase in overall axial length, substantially twice the torsional resilience which can be provided by a single coupling; also, sufficient space remains available within the torsion spring systems arranged around a central circle for the known elements of a universally mobile mounting to be disposed on the two inner coupling parts, so that the resulting coupling is of use not only for shafts offset angularly from one another, but also for shafts offset parallel from one another, and furthermore for shafts offset from one another both angularly and parallel. Since offsets of the shafts to be interconnected are unavoidable in many cases where resilient shaft couplings are used, a shaft coupling of the latter kind has the further advantage that restoring forces caused by the offset cannot react on the spring elements, and so the latter's mechanical strength is fully available for torque transmission.

Referring now to the drawings in detail, the single couplings shown in FIGS. 1 and 2 comprise a hub 1 on the input side and a hub 2 on the output side. The inner end of input hub 1 also forms the inner coupling member 3, and a flange 4 extending from the other hub 2 cooperates with a disc 5 to form the outer coupling part. The flange 4 and the disc 5 are positively interconnected.

To transmit the torque between the hubs 1 and 2, radial spring elements 7 are received in axial recesses 6 in the periphery of the inner coupling member 3; a torsion tube 8 is disposed at the outer end of each element 7 and extends free from torque through a bore 9 in the flange 4 to near the end of the coupling on the side of the hub 2. Extending through each torque tube 8 is a torque bar 10 which is connected to the torque tube 8 at the free end thereof in such a way as to rotate solidly therewith. This positive connection between the elements 8 and 10 can be devised in various ways. In the embodiment shown, a shrunk ring 11 is disposed on the tube 8 and presses radially thereon in the clamping zone to provide a positive connection.

The other end of the bar 10 is received in a bore 12 in the disc 5 in such a way as to rotate solidly therewith. As can be gathered from the cross-sectional view in FIG. 2, the radial spring elements 7 extend in the flange 4 in a chamber which the spring element 7 subdivides into two sectional chambers 13, 14. The chambers 13, 14 are filled with liquid; when the spring element 7 makes a relative movement, the liquid is displaced from one sectional chamber to the adjacent sectional chamber. Because of the relatively narrow flow cross-sections, therefore, liquid damping of any stressing of the shaft coupling results.

In the embodiment shown, outer hubs 15, 16 are universally or Cardanically mounted in a known manner by means of joints 17 on the hubs 1,2; an operative connection in the direction of rotation is provided by tooth systems. The advantage of such a mounting is that the shaft coupling can also be used to interconnect shafts whose axial alignment is out of true.

Referring to FIG. 1, lines 18 show how the force is transmitted from the hub 15 on the input side to the hub 16 on the output side of the shaft coupling. As will be clearly apparent, each radial spring element 7 is followed by a torsionally stressed spring element—i.e., a torsion tube 8 and a torsion bar 10—which have a relatively long effective spring length. Substantially the entire overall axial length of the shaft coupling is used for this purpose. The provision of the torsion spring systems increases the resilience of the coupling correspondingly. A particularly important point in this connection is that because of the special construction of the torsion spring systems, the increase in elasticity can be provided without the external dimensions of the coupling having to be increased.

Figure 3:
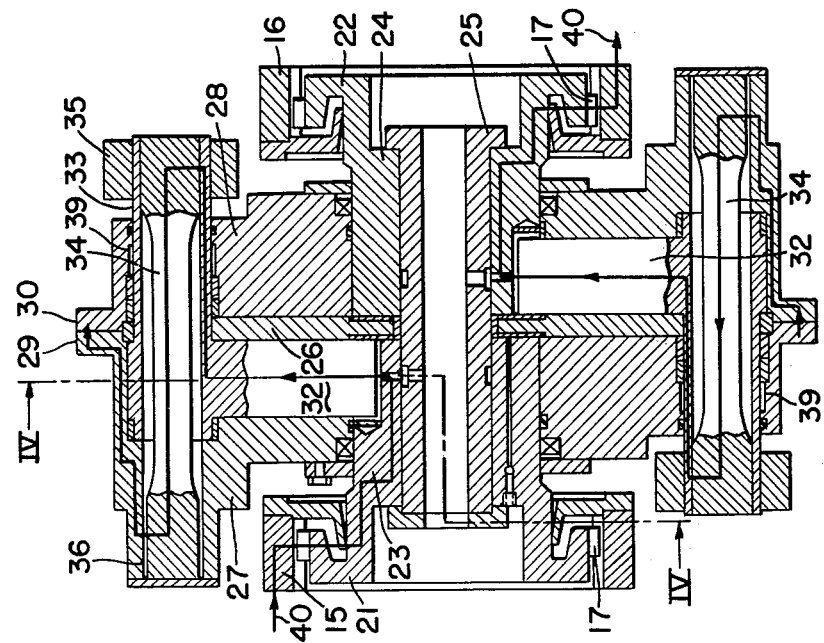
FIG. 3 is an axial section of a shaft coupling comprising two halves, the view being taken in the planes of the line III—III of FIG. 4.

FIGS. 3 to 5 show a shaft coupling comprising two halves, each half being devised essentially as a single coupling of the kind shown in FIGS. 1 and 2.

The double shaft has an input hub 21 and an output hub 22 on which, just as in the case of the single coupling, outer hubs 15, 16 are mounted universally by way of universal joints 17.

The hubs 21, 22 form the respective inner coupling parts 23, 24 at their inner ends for the corresponding coupling half. Both inner parts 23, 24 are mounted on a centering sleeve 25 in such a way as to be freely rotatable but axially immobile. An annular disc 26, or stop disc, is mounted between the end faces of the inner coupling parts 23, 24.

The inner coupling part 23, 24 of the double coupling serves for the rotatable mounting of the associated outer coupling parts 27, 28 respectively. On their outer periphery, the parts 27, 28 merge into annular flanges 29, 30 which engage with one another and are rigidly interconnected by appropriate means, such as screws or the like.

In each coupling half, radial spring elements 32 are mounted, just as in the case of the single coupling, in axial recesses 31 and have each a torsion tube 33 at their outer end. Extending in each tube 33 is a torsion bar 34 which is operatively connected to the free end of the tube 33 by means of a shrunk ring 35. At the opposite end, the bar 34 is received in a bore 36 of the associated coupling part 27 in such a way as to rotate solidly therewith. In this respect, each of the coupling halves resembles the single coupling of FIGS. 1 and 2.

Whereas in the case of the single coupling the outer coupling part forms part of the input hub, in the case of the double coupling the outer coupling parts 27, 28 of the two halves are so connected to the flanges 29, 30 as to rotate solidly with one another and are therefore connected in series so far as their torque-transmitting spring elements are concerned.

The liquid chambers 37, 38 in each individual outer coupling half 27, 28 respectively are basically similar to those of the single clutch or coupling, the chambers being subdivided in the two outer coupling parts 27, 28 by the disc 26.

As will be clearly apparent from the view in FIG. 3, the axiallY projecting ends of the tubes 33 of the adjacent coupling half extend through bores 39 in the outer coupling parts 27, 28. The enlarged sectional view in FIG. 5 shows details of the construction and mounting of two adjacent torsion spring systems. As will be apparent, the projecting tubes 33 alternately extend to opposite sides when viewed in the peripheral direction. This continuous change of direction of the projecting ends makes it possible for the torsion spring systems to be nested together in a practical manner as regards their different dimensions, thus ensuring optimum use of the available space. The tubes 33 are guided positively but free from torque in the bores 39 in the outer coupling parts 27, 28. Lines 40 indicate how the force is transmitted from the input hub 15 to the output hub 16 of the double shaft coupling. The double shaft coupling provides greatly increased torsional resilience for substantially the same external dimensions as compared with a single coupling.

The present invention is, of course, in no way limited to the specific disclosure of the specification and drawings, but also encompasses any modifications within the scope of the appended claims.

What I claim is:

1. An elastic shaft coupling for coupling one shaft to another wherein the shafts extend in substantially the same axial direction, which coupling includes a spring steel connection and liquid damping, the coupling comprising:
    an inner coupling part for connection to one shaft;
    an outer coupling part surrounding the inner coupling part for connection to the other shaft, the outer coupling part having a plurality of inwardly extending radial chambers therein which open adjacent the inner coupling;
    a plurality of leaf spring elements having first and second ends connected by a longitudinally extending web, the first end of each element being secured to the inner coupling part, and the web of each spring element extending through one of the radial chambers of the outer coupling part and dividing the chamber into two sections on opposite sides of the web;
    torsion tubes extending in the axial direction having first and second ends, each torsion tube being fixed adjacent its first end to the second end of one of the leaf springs;
    torsion bars extending within the torsion tubes and having first and second ends, each torsion bar being fixed at its first end to the second end of the leaf spring and being fixed at its second end to the outer coupling at a location in the axial direction overlying the inner coupling part to form a relatively compact elastic coupling, and
    liquid contained in the chambers for damping motion of the leaf springs as the liquid is displaced from one section of the chamber to the other due to flexing of the web of the leaf springs.

2. A shaft coupling according to claim 1, in which said torsion tube is in one piece with said radial leaf spring element.

3. A shaft coupling according to claim 1, in which the radial leaf spring element overhanging length of the projecting portion of said torsion tube is greater than half the entire length of said torsion tube.

4. A shaft coupling according to claim 1, which includes a shrunk ring disposed on said torsion tube to assist in clamping said torsion bar therein.

5. An elastic shaft coupling for connecting one shaft to another wherein the shafts extend in substantially the same axial direction, which coupling includes a spring steel connection and liquid damping, the coupling comprising:
    first and second inner coupling parts, each including means for connecting it to one of the shafts;
    first and second outer coupling parts, each of which surrounds a respective one of the inner coupling parts and each of which includes a plurality of radially extending chambers which open adjacent to the respective inner chamber;
    means for connecting the outer coupling parts to one another;
    a plurality of leaf springs, one for each radially extending chamber, each having a first end joined to a second end by a longitudinally extending web; each leaf spring being fixed at its first end to one of the inner coupling parts with its web extending radially in one of the radially extending chambers and dividing the radial chamber into two sections on opposite sides of the web;
    a plurality of axially extending torsion tubes, one for each leaf spring, each having a first and second end and each being fixed adjacent the first end thereof to the second end of one of the leaf springs;
    a plurality of torsion bars, one for each torsion tube, extending through the torsion tubes, each torsion bar having first and second ends, the first end of each torsion bar being secured to the second end of one of the tubes and the second end of each torsion bar being fixed to the respective outer coupling part at a location overlying the inner coupling part to which the leaf spring is fixed, and
    liquid filling the chambers for damping motion of the leaf springs as the liquid is displaced from one section of the chamber to the other due to flexing of the web of the leaf springs.

6. A shaft coupling according to claim 5, which includes a centering sleeve, said inner coupling parts being mounted on said centering sleeve in such a way as to be freely rotatable yet axially immobile.

7. A shaft coupling according to claim 6, which includes an annular disc mounted on said centering sleeve and closing said liquid-filled chambers of said coupling parts.

* * * * *